United States Patent [19]
Kaman

[11] Patent Number: 5,660,246
[45] Date of Patent: Aug. 26, 1997

[54] VEHICLE ACCESS CONTROLLER

[75] Inventor: Richard A. Kaman, Spring Grove, Ill.

[73] Assignee: Products Research, Inc., Addison, Ill.

[21] Appl. No.: 556,069

[22] Filed: Nov. 9, 1995

[51] Int. Cl.⁶ .................................................. B60R 25/00
[52] U.S. Cl. .................................................. 180/287
[58] Field of Search .................................................. 180/287

[56] References Cited

U.S. PATENT DOCUMENTS

| | | | |
|---|---|---|---|
| 4,009,375 | 2/1977 | White et al. | 235/150.24 |
| 4,926,331 | 5/1990 | Windle et al. | 364/424.04 |
| 5,157,610 | 10/1992 | Asano et al. | 364/424.03 |
| 5,227,766 | 7/1993 | Endo | 340/635 |
| 5,257,190 | 10/1993 | Crane | 364/424.03 |
| 5,370,201 | 12/1994 | Inubushi | 180/287 |
| 5,519,260 | 5/1996 | Washington | 180/287 |

FOREIGN PATENT DOCUMENTS

| | | |
|---|---|---|
| 64-138764 | 5/1989 | Japan . |
| 2 263 376 | 7/1993 | United Kingdom . |

*Primary Examiner*—Kenneth R. Rice
*Attorney, Agent, or Firm*—Welsh & Katz, Ltd.

[57] ABSTRACT

The vehicular access controller includes input means for detecting an indicia of identity of a prospective user and central station control means for comparing the indicia of identity with an indicia of identity of an authorized user. The controller further includes activating means for activating the vehicle when the control means determines that the indicia of identity from the input means substantially matches the indicia of identity of the authorized user.

6 Claims, 1 Drawing Sheet

VEHICLE ACCESS CONTROLLER

FIELD OF THE INVENTION

The field of the invention relates to methods of monitoring mobile vehicles and more particularly to methods of collecting operational information of mobile vehicles and securing such vehicles against unauthorized use.

BACKGROUND OF THE INVENTION

The need to collect operational information on mobile vehicles and to secure such vehicles against unauthorized use is well known. Recommended vehicular maintenance procedures are typically tied to vehicular use. The more a vehicle is used the more frequently the vehicle must be serviced.

Vehicle use is typically measured in terms of one of two parameters (miles or operating hours) providing indicia of usage. If the vehicle is a highway vehicle, then use is typically measured in terms of miles driven. If the vehicle is a lift truck or heavy equipment, then use is typically measured in hours of operation.

In small organizations where a single operator is assigned to a vehicle, the problem of vehicle maintenance may be trivial. The single operator assigned to the vehicle is made responsible for determining the need for maintenance and the obligation of reporting such requirements to a maintenance support staff. The operator is typically given a maintenance schedule (typically supplied by the vehicle manufacturer) and is assigned the responsibility of determining when the level of usage meets certain maintenance criteria. The operator typically possesses the only key to the vehicle, preventing use by others.

In somewhat larger organizations where more than one operator is assigned to a vehicle, one of the operators may be assigned the same responsibility. In such organizations, records of maintenance may even stay, and be stored, within the vehicle.

In still larger organizations, many operators may use a given vehicle within a given time period without any one operator being assigned to any given vehicle. A key allowing access to the vehicle may be left with the vehicle continuously.

In such organizations, central record-keeping (e.g., computer based) may become necessary to keep track of the need for vehicular maintenance. Where central record keeping is used, it becomes necessary for a designated person (i.e., a clerk) to remotely collect information from each vehicle for entry into the central record. Often the clerk will be assigned the responsibility of inspecting the vehicles and recording a reading of a vehicle hour meter (Hobbes meter) or odometer during an idle period at night or during a weekend. The scheduling of maintenance is then performed based upon the observations of the clerk or upon comparison of the recorded indicia of use with manufacturer supplied maintenance recommendations.

The effectiveness of a successful vehicle maintenance program is dependant upon reliable monitoring of the vehicle indicia of use and in security of use. Reliable monitoring of vehicle usage, on the other hand, is dependent upon ready access to the vehicles. In some organizations, mobile vehicles are constantly in use, seven days a week. Further, the vehicles may not be stored in a common location or other organizations may borrow vehicles for short or extended periods. Even where ready access is available, errors often occur in recording data by a maintenance clerk. Unauthorized users may subject the vehicles to unusual or improper operating conditions. Because of the importance of vehicular maintenance, a need exists for a better method of collecting information on vehicle usage and preventing unauthorized use.

SUMMARY OF THE INVENTION

Accordingly it is an objective of the invention to provide a means of remote vehicle control and messaging that is not dependent upon vehicle location.

It is a further objective of the invention to provide a means of vehicle control that is simple and flexible.

These and other objects are provided in a novel vehicular access controller. The vehicle access controller includes input means for detecting an indicia of identity of a prospective user and central station control means for comparing the indicia of identity with an indicia of identity of an authorized user. The controller further includes activating means for activating the vehicle when the control means determines that the indicia of identity from the input means substantially matches the indicia of identity of the authorized user.

The indicia of identity may be an access code entered through a keypad or the output of a card reader. The indicia of identity may be compared with indicia of authorized users either locally or within a central computer through a transceiver providing a wireless interconnect between the vehicle controller and central computer.

DETAILED DESCRIPTION OF A PREFERRED EMBODIMENT

Figure 1:
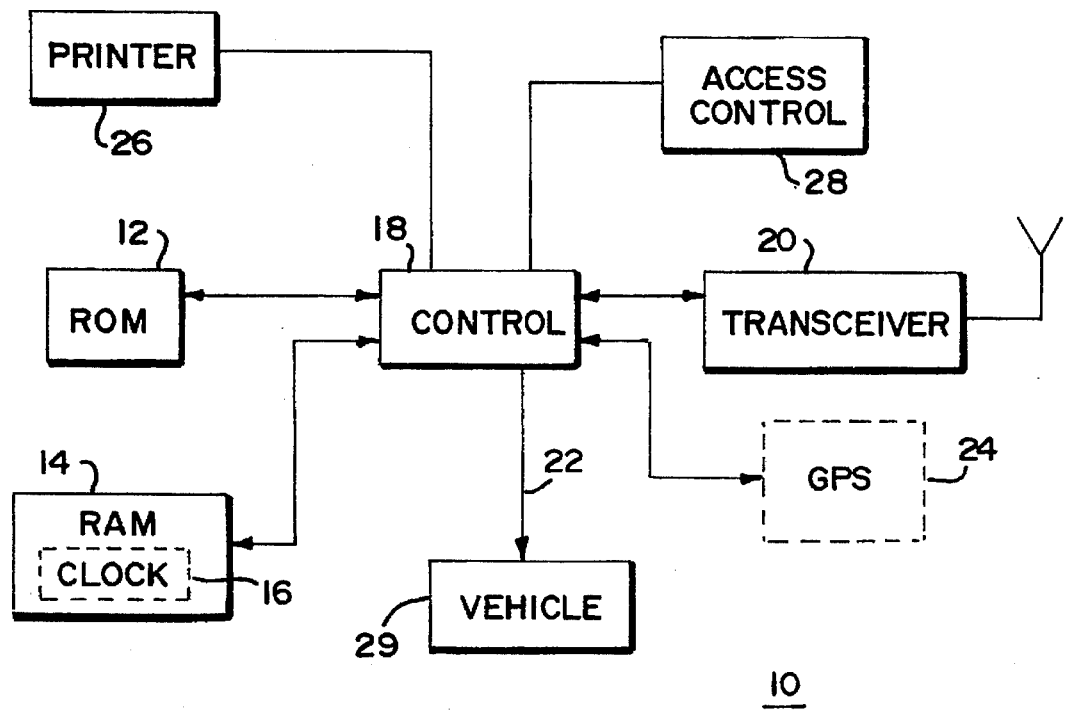
FIG. 1 is a block diagram of a vehicle mounted data collection unit in accordance with an embodiment of the invention.
Figure 2:
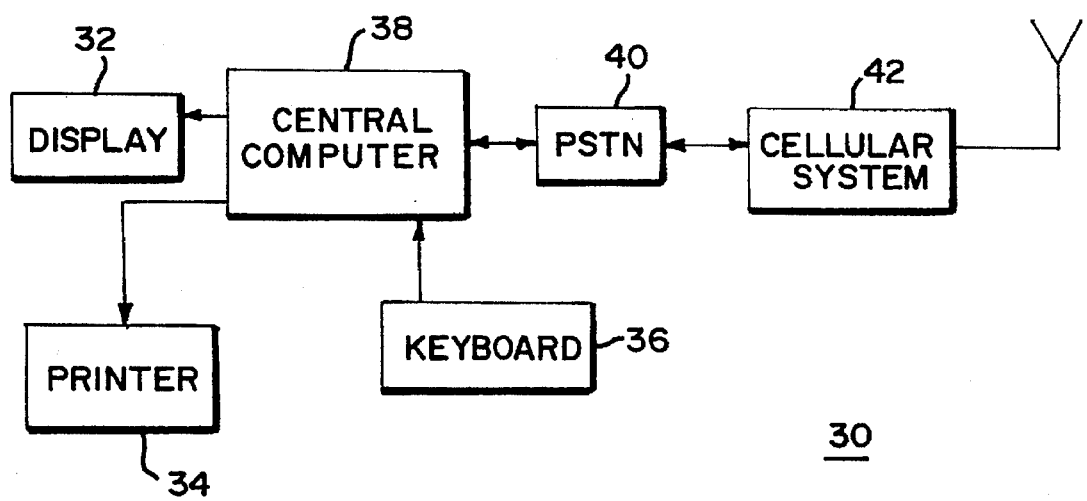
FIG. 2 is a block diagram of a central data collection unit for collecting information supplied by the vehicle mounted data collection units of FIG. 1.

FIG. 1 is a block diagram of a mobile vehicle data collection unit 10, generally, in accordance with an embodiment of the invention. Included within the data collection unit 10 is a transceiver 20 for transmitting vehicular information from the data collection unit 10 to a central data collection unit computer 38 (FIG. 2) through a cellular system 42. The central data collection unit computer 38 may be interconnected with the cellular system 42 through a public switch telephone network (PSTN) 40 as shown in FIG. 2 or through leased lines.

Under the embodiment, a central computer 38 operating through the PSTN 40 and cellular system 42 forms a stationary portion (central data collection unit) 30 of a central maintenance support system that may include a number of data collection units 10, each mounted within a supported vehicle. The central data collection unit 30 and data collection units 10 together form a maintenance control system for the supported vehicles.

Each vehicle data collection unit 10 contains a controller 18 for collecting and formatting information received through the vehicle interface 22, and memory units 12, 14 for storing information. The memory 12, 14 includes a random access memory (RAM) 14 for storing information collected through the vehicle interface 22 and also a read only memory (ROM) 12 for storing operating software used by the controller 18. The RAM 14 also contains an internal clock 16 for accumulating indicia of vehicle operating time.

The vehicle collection unit 10 contains a transceiver 20 for transmitting information to the central data collection unit 30. An optional global position sensor 24 is also shown in FIG. 1.

FIG. 2 is a block diagram of a central data collection unit 30, generally, in accordance with the embodiment. Under the embodiment, a computer 38 correlates and collects maintenance information (e.g., indicia of usage) on a number of vehicles and provides maintenance recommendations via the display 32 and printer 34. In administering maintenance records, the computer 38 contains a file for each vehicle which includes a most recent usage report and could include usage history and other service records.

The computer 38 also contains (stored within the file for each vehicle) a vehicle identifier (ID) of each data collection unit 10. Using an ID of an appropriate data collection unit 10, the computer 38 may access any data collection unit 10 within the maintenance control system at any time through the local public service telephone network (PSTN) 40 and cellular network 42. Access is provided to a particular vehicle collection unit 10 by a transmitted access request containing the ID from the computer 38 through the cellular system 42 and PSTN 40. The request uniquely identifies the data collection unit 10 and causes the data collection unit 10 to respond with transmissions containing an information response directed back to the central computer 38, through the cellular system 42.

Under the embodiment, the central data collection unit 30 and vehicle data collection system 10 may exchange data on a two-way wireless communications link through the cellular system 42 under a cellular digital packet data (CDPD) format. For technical information on CDPD, the reader is referred to the CDPD Forum, 401 N. Michigan Ave., Chicago, Ill. 60611 and to the CDPD specifications.

Data exchange between the central data collection unit 30 and vehicle data collection unit 10 may occur under any of a number of different protocols and communication systems. Other Examples include the packet switching network offered by RAM Mobile Data of 745 Fifth Avenue, New York, N.Y. 10151 or communications under the ARDIS system jointly developed by IBM and Motorola, Inc.

Under the CDPD format, the ID of the vehicle data collection unit 10 is an Internet Protocol (IP) address and not a telephone number. The use of an IP address (transmitted within the packet) allows for very rapid exchange of information. The rapid exchange also allows the CDPD system to substantially reduce access fees and to instead, charge based upon the number of bits transmitted within a time period. The minimal size of vehicle indicia of use files allows the maintenance systems to be administered through the CDPD system at minimal cost.

Under CDPD, transceivers 10, 42 use unoccupied channels of a local cellular system. A central transceiver of the CDPD system, that may be located proximate to a local cellular base station, may transmit a marker signal on unused cellular channels while monitoring a cellular control channel for channel assignments. The marker causes remote transceivers (e.g., vehicle data collection units 10) to scan for and monitor channels with detected marker signals. The vehicle collection units 10 remain on the marked channel so long as a marker signal is present and, in doing so, are able to transceive messages with the central transceiver of the CDPD system.

By monitoring the cellular control channel the CDPD system has advance indication that the marker channel is about to be allocated within the cellular voice system. When the CDPD central system detects that a cellular channel is about to be allocated within the cellular system, the CDPD system simply moves to another unoccupied cellular channel. When the remote transceivers detect an absence of the marker signal, the remote transceivers simply scan for a new marker signal on another unoccupied cellular channel.

Communication on the CDPD system is two-way and is based upon an ID address. Each remote transceiver 10 receives each packet and decodes the IP address. IF the packet is addressed to the remote 10 then the remote decodes the rest of the packet. If not, the remote 10 simply discards the packet.

Similarly the central CDPD transceiver 42 receives every packet transmitted by a remote transceiver 10 within range of the central transceiver 42. Unlike the remote 10, however, after the central transceiver 42 decodes the IP address, the central transceiver 42 must route the packet to its intended target. The central transceiver 42 routes the packet by comparing a received IP address with a routing table (not shown). The routing table identifies to the central transceiver 42 the appropriate trunk line through which to forward the received packet. Similarly the PSTN 40, also by reference to a routing table, determines that a packet received from a remote transceiver 10 is to be routed to the computer 38 by reference to the IP address within the packet and to a routing table.

The central data collection unit 30 may be programmed to collect data from each of the vehicle collection units 10 at predetermined time intervals (e.g., once every 30 days). Where a large organization is involved, with many vehicles, the central computer 38 may sequentially transmit information requests to vehicle collection units 10 followed by a time interval provided after each transmission for receipt of a response. Where a vehicle does not respond (or does not hear the information request) the central computer 38 retransmits the information request after a time period.

Under the embodiment, the central computer 38, upon receiving a response, stores the received indicia of use in a vehicle file associated with an ID of the response and sets a flag indicating a need for further processing. At predetermined intervals, the computer 38 processes each file to generate a maintenance schedule based upon usage threshold levels for the benefit of a maintenance support staff. To generate a maintenance schedule the computer 38 retrieves the latest indicia of usage and compares the indicia (miles or hours) with a predetermined maintenance value. Where the indicia of usage meets or approaches the pre-set maintenance value, the computer 38 generates a report listing an identifier of the vehicle (make, model, etc.) and the necessary maintenance procedure.

Turning now to the vehicle collection unit 10, a description will now be offered as to features and operating characteristics of the vehicle collection unit 10. Further explanation will also be offered as to the central data collection unit 30 insofar as necessary to understand the interaction between the vehicle collection unit 10 and central data collection unit 30.

As shown in FIG. 1, the vehicle collection unit 10 interfaces with the monitored vehicle 29 through a vehicle interface 22. The vehicle interface 22 may be a single pair of conductors providing a contact closure or opto-isolated signal upon activation of the vehicle. Where the vehicle is battery powered, indication of vehicle activation may be provided by a limit switch mechanically connected to a throttle lever. Where the vehicle is gasoline or diesel powered equipment, the indication of vehicle activation may be provided by a contact interconnected with an ignition switch.

The interface 22 may also be several pairs of conductors for monitoring multiple functions such as vehicle activation or speed above a certain threshold, or it may be a data bus interfacing with a vehicular engine control computer providing data on mobile operation that may be used under an appropriate algorithm to generate a profile of the vehicle operating environment.

Where the indicia of usage from the vehicle interface 22 is an on-off signal simply providing indication of vehicle activation time (i.e., whenever the signal is "on") then the control 18 functions as a time keeper accumulating time whenever the vehicle is activated. In such a case, the controller 18 activates an internal counter (clock) 16 under an appropriate time base whenever the interface signal 22 is enabled and deactivates the counter whenever the interface signal 22 is disabled. The current count may be held in a non-volatile memory 16 and be incremented by the controller 18 at regular intervals (e.g., every minute, or second, or fraction thereof) using known methods.

The indicia of vehicle use may also be miles driven and may be provided by an odometer output or from an electronic speed control. In such a case the counter (clock 16) may be incremented by an electric signal caused by rotation of a mileage indicating component of the transmission, in turn, activating a magnetic sensor.

Periodically, the controller 18 of the vehicle collection unit 10 receives information requests from the central computer 38 through the transceiver 20. Under CDPD, information exchanged between the vehicle collection unit 10 and central computer 30 is packet data transferred over a packet switched network. As such, each packet transferred over the network contains a header which contains the ID of the communication target (i.e., vehicle collection unit 10 or central computer 30) depending on the direction of data flow.

As each packet is received by the transceiver 20 of the vehicle collection unit 10, the packet contents are reduced to a baseband signal within the transceiver 20 and transferred to the controller 18. The controller 18 compares the transmitted ID located within the received packet to an ID of the vehicle collection unit 10 stored within ROM 12. Where no match is found, the controller 18 discards the packet and continues along the path of normal processing (e.g., accumulating the indicia of use through the vehicle interface 22).

Where a match is found identifying the vehicle collection unit 10 as the communication target, the contents of the packet are then examined for a specific instruction from the central computer 38. The specific instruction of the data packet may be an identifier of a location of a specific subroutine stored within ROM 12. The specific subroutine may provide a communication check wherein the vehicle collection unit 10 simply responds by transmitting a data packet to the central computer 38 thereby informing the central computer 38 that the vehicle collection unit 10 is active and within range of a cellular base station of the cellular system 42.

Under the embodiment, the ID of the source of the transmission may be included in each data packet so that the data collection unit 10 can identify a transmission source or the vehicle collection unit 10 may retrieve the ID of the central computer 38 from ROM 12.

Under the embodiment, where the vehicle collection unit 10 receives a packet from a requestor (e.g., central computer 38) addressed to the unit 10 requesting indicia of usage, the controller 18 retrieves such information from RAM 14, along with the ID of the requestor 38 and composes a data packet in response to the request. Contained within the packet is an ID identifying the requestor 38 as the communication target of the transmission. Contained within the body of the packet is the data requested (e.g., the contents of the clock 16) and the ID of the transmitting data collection unit 10.

Also contained within the packet is a data field specifying packet length. Since the maximum allowed packet length within the CDPD system is 2000 characters, it is clear that the indicia of use (and the data packet) may be of virtually any size and may contain a value of the indicia of use ranging from a value accumulated since the last read cycle to a totalized value accumulated since a time of the vehicle's manufacture.

Upon completion of the creation of a response packet, the vehicle collection unit 10 transfers the packet to the transceiver 20. The transceiver 20 encodes the packet under an appropriate modulation format on a selected transmission channel and transmits the packet to a nearby cellular base station of the cellular system 42. The cellular system 42, in turn, decodes the header of the packet and routes the packet based upon the ID of the packet through the PSTN 40 to the central computer 38.

Under another embodiment of the invention an optional global position system (GPS) 24 is used as an adjunct to usage monitoring to locate a vehicle to be serviced. The GPS 24 may be any of a number of portable GPS systems currently available such as the one available from Motorola, Inc.

To locate a vehicle 29, the central computer 38, upon determining a need, transmits an information request to the vehicle data collection unit 10 containing a location request. The controller 18 of the vehicle data collection unit 10 upon decoding the information request, uses the location request to identify a GPS access routine within ROM 12. Using the access routine, the controller 18 accesses the GPS 24 for a current location of the vehicle 29 and composes a location response for transmission back to the central computer 38.

In another embodiment, the indicia of use includes certain parameters associated with engine condition. Under the embodiment, an engine sensor provides an output of an engine oil level. Another set of sensors provide indication of transmission fluid level and/or radiator fluid level. A further set of sensors may provide indication of engine block temperature. Under the embodiment, the data collection unit 10 may transmit a summary of indicia back to the central computer 38 with each parameter assigned to a specific data field or the data collection unit 10 may respond with a specific indicia based upon a specific received command.

In another embodiment, the data collection unit 10 transmits indicia of usage based on operator performance. Under the embodiment, the data collection unit 10 records certain operating usage parameters for transmission back to the central computer 38. If the vehicle has an internal combustion engine, the parameter may be a maximum revolutions per minute (RPM) of the engine over a time period. Maximum braking rate may be reported. The operator may also be required to visually examine the vehicle for safety defects and certify to the operability of the vehicle by periodically activating a special "Safety Inspection" button.

In another embodiment of the invention, the data collection unit 10 also provides vehicle access control and short messaging. Under the embodiment, vehicle access control may be provided through an access control device 28. The access control device 28 may be any device structured for determining indicia of identity of a prospective vehicle user (e.g., a keyboard, a magnetic card reader, a key card reader, a fingerprint scanner, or a retinal scanner). Where the access control device 28 is a keypad or cardreader, the indicia of identity may be an access code. Where the access control device 28 is a fingerprint or retinal scanner, the indicia of identity is the output of the scanner.

The data collection unit 10 (now more properly referred to as a vehicle controller 10) may keep a record (i.e., indicia of identity) of each authorized user (recognized through the access control device 28) or may request and receive access authorization for each vehicle use from the central computer. Where access is provided through the central computer 38, the controller 18 transfers the indicia of identity from the access control device 28 to the central computer 38 through the wireless data link provided by the two-way transceivers 20, 42. The central computer compares the indica of identity with each file of authorized users and, if a match is found, responds with an access grant also returned through the wireless data link.

Where access control is performed locally (i.e., within the vehicle controller 10), the central computer 38 periodically downloads files on authorized users. The downloaded files are stored by the controller 18 in a local memory 14. When a prospective user presents indicia of identity through the access control device 28, the local controller 18 compares the indicia of identity with the files of authorized users. Where the indicia of identity substantially matches one of the files of authorized users, the controller grants the prospective user access to the vehicle 29. The grant of access, activating the vehicle 29, may mean unlocking an external door of the vehicle 29 (where the access control device 28 is also located external to the vehicle) or may mean closing a contact placed in series with an ignition circuit of a motor of the vehicle 29.

In general when a match is found (i.e., the person presenting indicia of identity to the access control device 28 is an authorized user), the controller 18 activates the vehicle 29 through the interconnect 22. The controller 18 may activate the vehicle 29 by contract closure through the interconnect 22 or by transmission of an activation code to a controller (not shown) of the vehicle 29 through the interconnect 22.

Where access grants are handled locally, the central computer 38 may periodically interrogate the vehicle access controller 10 for a list of users and time of use. Where an unauthorized access is determined (i.e., the vehicle was activated outside of normal working hours) or a card was lost, stolen, or expired, the central computer may download a new set of files identifying authorized users (thereby denying access to unauthorized users using indicia of identity of authorized users).

Alternatively, where access is determined by the central computer 38, the appropriateness of access may be determined real time. Where a magnetic card (or keypad access code) is identified as having been lost or stolen, the central computer 38 simply denies access. The central computer 38 may deny access by simply not responding to the access request transmitted by the vehicle controller 10, or may respond with a lock-out command to an existing vehicle security system.

Under the embodiment, short messages may also be delivered to authorized users through the printer 26 of a particular vehicle 29. The particular vehicle 29 to which the message id delivered is determined by the matched indicia of identity previously entered by a prospective user.

The message may be entered through the keyboard 36 of the central computer 38 or may originate from a subscriber (not shown) within the PSTN 40. The central computer 38 delivers the message to a particular user (or vehicle) through the cellular system 42. Where a message is directed to the vehicle (e.g., "BRING THIS VEHICLE IN FOR SERVICE"), the central computer 38 delivers the message to the printer 26 of the vehicle controller 10 based upon the identifier of the vehicle controller 10.

Where the message is directed to a particular user, the central computer 38 may poll each vehicle controller 10 to find a user or search a most recent user list (within the central computer 38) to identify the vehicle most recently operated by the user. When the proper vehicle is identified, the central computer 38 transmits the message to the vehicle controller 10 which then prints out the message via the printer 26 for the benefit of the user.

In another embodiment, short messaging may be directed from an operator of the vehicle, through the vehicle controller 10 to an operator monitoring the central computer 38. Examples of the types of short messaging may include indication of vehicle failure or an intention to leave the vehicle unattended. The operator may enter such short messages through a keypad of the access control device 28 by entry of a symbolic code (e.g., "11" for engine won't start, "22" for leaving vehicle to get coffee, "33" work shift over, "44" for left front tire flat, etc.).

The operator may differentiate the entry of symbolic codes from the entry of other codes (e.g., indicia of identity) entered through a keypad of the access control device 28 by prefacing the symbolic code with a symbolic code identifier (e.g., the "*" key, "#" key, etc.). The operator may signal completion of entry of a symbolic code by a second use of a symbolic code identifier (e.g., the same symbolic code identifier "*", "#" or "*" prefaces a symbolic code and "#" indicates completion of symbolic code entry).

The controller 18 of the vehicle controller 10, upon receipt of a symbolic code through the access control device 28, formats a message to the central computer 38 indicating the symbolic content of the message. The central computer 38 upon receipt of a symbolic message directs the symbolic code (or a text equivalent of the symbolic code) to the display 32 or printer 34 along with a vehicle (or operator) identifier.

A specific embodiment of novel apparatus of collecting vehicle usage information according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A vehicular access and control system comprising:

a vehicle;

input means located on the vehicle for detecting an indicia of identity of a prospective user;

a controller located on the vehicle for formatting data transfers including the indicia of identity and an identifier of the vehicle to a central station;

a two-way wireless interconnect coupled to the controller for transferring the indicia of identity and the identifier of the vehicle to the central station;

control means at the central station for comparing the transferred indicia of identity with an indicia of identity of an authorized user and for transferring an activation signal to the vehicle through the two-way wireless interconnect upon determining a match;

memory at the central station for storing the received indicia of identity and identifier of the vehicle;

activating means located on the vehicle for activating the vehicle when the control means determines that the indicia of identity from the input means substantially matches the indicia of identity of the authorized user; and a printer located on the vehicle and coupled to the central station through the wireless interconnect for printing messages from the central station.

2. The apparatus as in claim 1 wherein the central station further comprises a message input means for receiving a message for an authorized user as well as an indicia of identity of the authorized user.

3. The apparatus as in claim 2 wherein the central station further comprises a second controller for searching the second memory for an identifier of a vehicle last transmitting the indicia of identity of the authorized user.

4. The apparatus as in claim 3 wherein the central controller further comprises a third controller for transferring the message to the printer of the vehicle last transferring the indicia of identity of the authorized user.

5. A vehicular access and control system comprising: a vehicle;

a printer located on the vehicle;

a cardreader located on the vehicle for detecting an indicia of identity of a prospective user;

a two-way radio frequency transceiver for transferring the indicia of identity to a central station;

a first computer at the central station for storing the transferred indicia of identity along with an identifier of the vehicle in a first computer memory, comparing the transferred indicia of identity with an indicia of identity of an authorized user and, upon determining a match, transferring an activation signal to the vehicle through the two-way radio frequency transceiver;

an interconnect located on the vehicle for activating the vehicle upon receipt of an activation signal from the control means;

a keyboard in communication with the central station for entering messages and indicia of identity of the authorized user; and;

a second computer at the central station for identifying by reference to the first computer memory the vehicle transferring the indicia of identity of the authorized user and for transferring the message to the printer of the identified vehicle.

6. The apparatus as in claim 5 wherein the central station further comprises a two-way radio frequency transceiver.

* * * * *